United States Patent [19]

Rasmussen

[11] 4,084,028
[45] Apr. 11, 1978

[54] HIGH STRENGTH LAMINATE

[76] Inventor: Ole-Bendt Rasmussen, 7, Topstykket, 3460 Birkeroed, Denmark

[21] Appl. No.: 657,647

[22] Filed: Feb. 12, 1976

[30] Foreign Application Priority Data

Feb. 12, 1975 United Kingdom ............... 5973/75

[51] Int. Cl.$^2$ ............................................. B32B 5/12
[52] U.S. Cl. ...................................... 428/105; 428/113; 428/255; 428/297; 428/910
[58] Field of Search .............. 428/105, 113, 294, 255, 428/297, 397, 910

[56] References Cited

U.S. PATENT DOCUMENTS

| | | | |
|---|---|---|---|
| 2,851,389 | 9/1958 | Lappala | 428/220 |
| 3,307,690 | 3/1967 | Bond et al. | 428/295 |
| 3,404,748 | 10/1968 | Bjorksten | 420/105 |
| 3,471,353 | 10/1969 | Rasmussen | 428/105 |
| 3,496,059 | 2/1970 | Rasmussen | 428/910 |
| 3,622,428 | 11/1971 | Robinson | 428/113 |
| 3,762,983 | 10/1973 | Osborn | 428/910 |
| 3,791,911 | 2/1974 | Yaeger et al. | 161/58 |
| 4,039,364 | 8/1977 | Rasmussen | 156/164 |

*Primary Examiner*—William R. Dixon, Jr.
*Attorney, Agent, or Firm*—William J. Daniel

[57] ABSTRACT

A high strength laminate is formed of at least two films of polymeric material each having a predominant grain direction which films are arranged with their grain directions in intersecting or crossing relationship, each adjacent pair of such films being laminated together by an intermediate adhesive bonding layer, an array of filamentitious structures, e.g. parallel continuous filaments, staple fibers, or a split film network, which array has a generally predominating lengthwise direction being disposed within each such bonding layer with the lengthwise direction thereof oriented in an intersecting or crossing relation to the grain directions of both of the adjacent films, the filamentitious structures of such array being substantially free of any adhesive bonding with the intermediate adhesive layer and having a significant stretch capacity.

7 Claims, 1 Drawing Figure

U.S. Patent      April 11, 1978      4,084,028
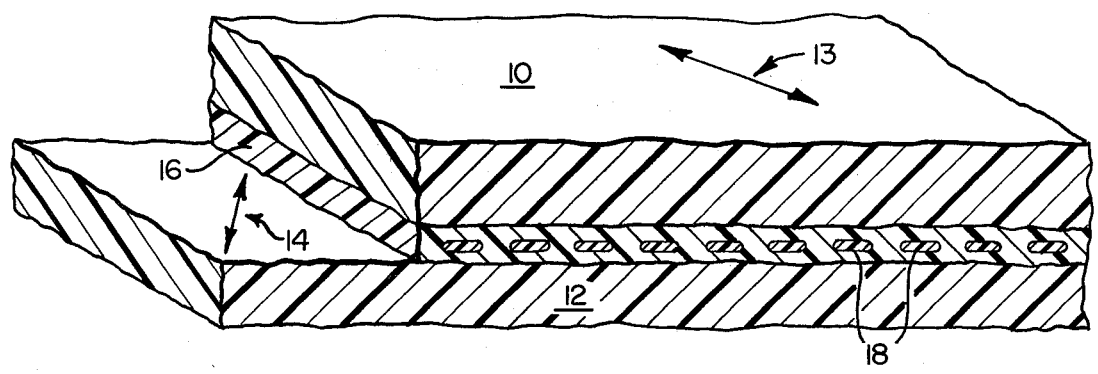

HIGH STRENGTH LAMINATE

My copending U.S. patent application No. 592,273, now U.S. Pat. No. 4,039,364 relates to a sheet (and method for its manufacture) consisting of two or more layers of thermoplastic polymer, each of said layers exhibiting a polymer grain as formed when the polymer is strongly attenuated in molten state, these layers being arranged with their grains in criss-crossing relation and with a poor or relatively poor overall bonding —(- which) may be strong in spots or (lines) established between adjacent layers of different polymer grain, and the grained layers in the ultimate sheet being in biaxially oriented state.

One embodiment of this method includes the steps of forming in an extrusion process at least two molten coaxial tubular streams or circular arrays of streams from thermoplastic polymer material, preferably a blend of incompatible to semi-compatible polymers, rotating at least one of said tubular streams or circular arrays of streams relative to another one, while strongly attenuating said streams to form impart grains thereto which have different predominate directions, uniting the tubular grained streams or circular arrays of grained streams into a common sheet to form a laminate while taking steps to form an overall weak bond (which can be constituted by alternating areas of strong and weak bonds) between layers of directionally different polymer grain, solidifying the cross-laminate by cooling, and as a final, optional but preferable step, biaxially orienting each grainy layer in its solid state by stretching the laminate in separate uniaxial steps, while maintaining the criss-crossing grain direction of the layers.

According to another embodiment of that invention, at least one layer with its grain extending at an angle to the machine direction is formed by means of a rotating hollow circular or annular extrusion die, which is in circumjacent relation with a mandrel onto which the still fluid polymer is wound. A pre-formed solid sheet having a longitudinal polymer grain is laid upon and forwarded along the mandrel, whereby this pre-formed sheet acts as a conveyor of the wound-on polymer and also laminates to the latter so as to be present as one layer of the final sheet product. Also in this case, there is established only a weak bond between adjacent layers of criss-crossing grain — or preferably a pattern of alternating weak and strong bonds. Finally, according to a third embodiment of the mentioned application, a similar product can be produced without using rotating die-parts, e.g. by the following sequence of steps:

1. extruding a tubular film while attenuating it in the longitudinal direction by simple draw-down (simultaneous cross-drawing by blowing should preferably be avoided) and solidifying the film;
2. cutting the tubular film helically and unfolding it to flat form so as to obtain a film with obliquely directed polymer grain;
3. laminating the film so produced with at least one similarly produced film with an obliquely directed polymer grain, or with at least one film having a longitudinal polymer grain so that the grains extend in different directions; and
4. biaxially stretching the laminate, with orientation, in separate uniaxial steps, preferably below the temperature at which the grain changes by recrystallization.

No matter which one of the above mentioned procedures is followed, the polymer "grain" produces a tendency for each layer to split or flow in one direction generally parallel to the particular grain direction of that layer. During tearing from an incision, the criss-crossing layer arrangement in cooperation with the low bonding strength between adjacent layers will therefore produce a delamination in the area where the tear propagates, at the same time as the tear "forks" out in different directions in the different layers. The notch-effect is hereby significantly reduced and the tear propagation resistance becomes high. A particularly high tear propagation resistance is achieved when a pattern of strong bond/weak bond is applied, so that the "forking" is easily initiated, but stops or progresses under high resistance in the areas of strong bonding.

The present invention relates to an improvement in connection with the bonding zone in this type of laminate.

The invention consists in the incorporation in the bonding zone between layers of mutually criss-crossing grain of a minor amount of fibers which 1. in the final product still possess a very substantial capacity for extension or stretching, preferably exceeding that of the individual layers;
2. have their lengthwise direction at an angle with the grains of both adjacent layers; and
3. are not strongly adhesively bonded, i.e., are bonded poorly or not at all, to their surroundings.

In connection with the incorporation of such fibers, the bonding between the layers, except in the areas interrupted by the fibers, should preferably be of medium strength.

When two-layer "cross-laminates" of medium bonding strength are torn starting from an incision, the tear normally will not "fork" out but will generally follow the "grain" in one or the other of the layers. The fibers used according to the invention contribute two effects. First, they "bridge" over the split and thereby smooth out, i.e. reduce, the notch-effect. Second, they act like "tear strips" in the sense that they positively, by exercise of force, assist in producing delamination of the layers. For both effects, it is essential that there is a substantial capability to stretch left in the fibers and also that their bonding to the surroundings is weak. The "fibers" are preferably continuous structures so as an array of parallel filaments, or slit or split film in the form of a network. The "fibers" may also e.g. be constituted of an array of multifilament yarn or staple yarn, and in fact individual staple fibers can also be used. The minimum staple length will depend upon the bond strength between the fibers and their surroundings, shorter lengths being possible with higher strengths, but generally the staple length should be at least 0.5 cm. When using filaments, it has been found preferable that the latter are significantly flat, so that the area which each filament covers is high in proportion to its weight. (The "fibers" in a split or slit film will practically always be flat). To achieve a regular lay-down of the flat filaments, they should preferably be extruded directly at the place of lamination. In connection with the above mentioned co-extrusion procedures with rotating die-parts, there can therefore preferably be provided one or several rows of orifices, either rotating or fixed, for introducing the filaments between the layers.

In connection with cross-laminates of obliquely uniaxially oriented films (e.g. laminates of two layers each oriented under an angle of 45°), the present invention can conveniently be practiced in connection with extrusion lamination of such films, i.e., where an adhesive layer is extruded between the films, the die for extruding the bonding layer being adapted to coextrude preferably flat filaments completely encased within the bonding layer or embedded in one surface or the other of the bonding layer. Of course, previously formed filaments can be introduced between the film layers during extrusion lamination instead of being coextruded in situ.

In example 1 of application Ser. No. 592,273, I disclose a procedure in which the bonding between two films of different grain direction is established by means of adhesive surface layers coextruded upon each such film. This procedure has with advantage been modified by feeding in between the two films a parallel array of multi-filament yarns of unoriented polyethyleneterephthalate. Each yarn was a 200 denier yarn, and the spacing between the yarns was 5 mm. In the first stretching and lamination step, the temperature was increased to 80° C to increase the bond strength between the films.

Products of the present invention are preferably characterized in that the fibres are formed of a polymer with a melting point above that of each of the films. Thus in connection with films of polyolefin, a higher melting polyamide or polyethyleneterephthalate are particularly convenient. Apparently, the improvement in using the higher melting fibers is connected with the fact that quick tearing causes local melting or semi-melting of the films, so that even very small amounts of higher melting fiber has a pronounced effect in controlling the tearing. When using polyamide or polyethyleneterephthalate fibers in connection with polyolefin film, a fiber content between 1-5% is suitable.

One embodiment of a product according to this invention is illustrated in the accompanying drawing in the form of a partially cutaway fragmentary perspective. In this embodiment, two films 10 and 12 having grain directions indicated by the arrows 13 and 14 are laminated together so that the grain directions cross another with an adhesive layer 16 having medium level adherence to the film surfaces. An array of parallel flat filaments 18 are embedded within the adhesive layer 16 with their lengthwise direction extending in a direction different from, i.e., out of alignment with, the grain directions of both films 10, 12.

The content of fibers or filaments, which can be referred to generally as filamentous structures, can vary widely depending upon the strength of the fibers. For strong fibers, e.g. nylon or polyethyleneterephthalate fibers, 1-5% will usually suffice while for fibers of weaker material, e.g. polypropylene or high density polyethylene, a range of about 4-25%, all by weight, is suitable although more could be added if desired.

The fibers or filaments can be coated with a slipping agent, such as a lubricant or mutually incompatible polymer or even a low viscosity pressure sensitive adhesive, to reduce the adhesion thereof for the bonding layer material. The fibers or filaments can also have their opposite surfaces abutting the adjacent film surfaces with the bonding material confined to the intervals between the same.

For a better understanding of what is intended by the references here to weak bonding, strong bonding and the like, reference may be had to the disclosure of the above-mentioned application Ser. No. 592,273. Preferably, the films are bonded with a non-pressure-sensitive adhesive because of the tendency of such adhesive to creep significantly under stress.

What is claimed is:
1. A high strength laminate comprising at least two films of polymeric material, each having a predominant grain direction, arranged with said grain directions in intersecting relation, each adjacent pair of said films being laminated by an intermediate adhesive bonding layer, and an array of filamentitious structures having a generally predominate lengthwise direction disposed in each such bonding layer with said generally predominate lengthwise direction of said array extending in intersecting relation to the grain directions of both the adjacent films, said filamentitious structures being substantially free of adhesive bonding with said adhesive bonding layer and having a significant stretch capacity.

2. The laminate of claim 1 wherein said filamentitious structures constitute about 1-25% by weight of said laminate.

3. The laminate of claim 1 wherein said filamentitious structures comprise parallel continuous filaments, staple fibers having a length of at least 0.5 cm, or a split film network.

4. The laminate of claim 1 wherein said filamentitious structures are coated with a slipping agent to reduce the adheisve bonding thereof with said adhesive bonding layer.

5. The laminate of claim 1 wherein said intermediate adhesive bonding layer has medium adhesive strength with the adjacent film surfaces.

6. The laminate of claim 1 wherein said filamentitious structures are comprised of a polymeric material having a higher melting point than the melting point of the polymeric material of said two films.

7. The laminate of claim 1 wherein said filamentitious structures are in the form of flat filaments.

* * * * *